UNITED STATES PATENT OFFICE.

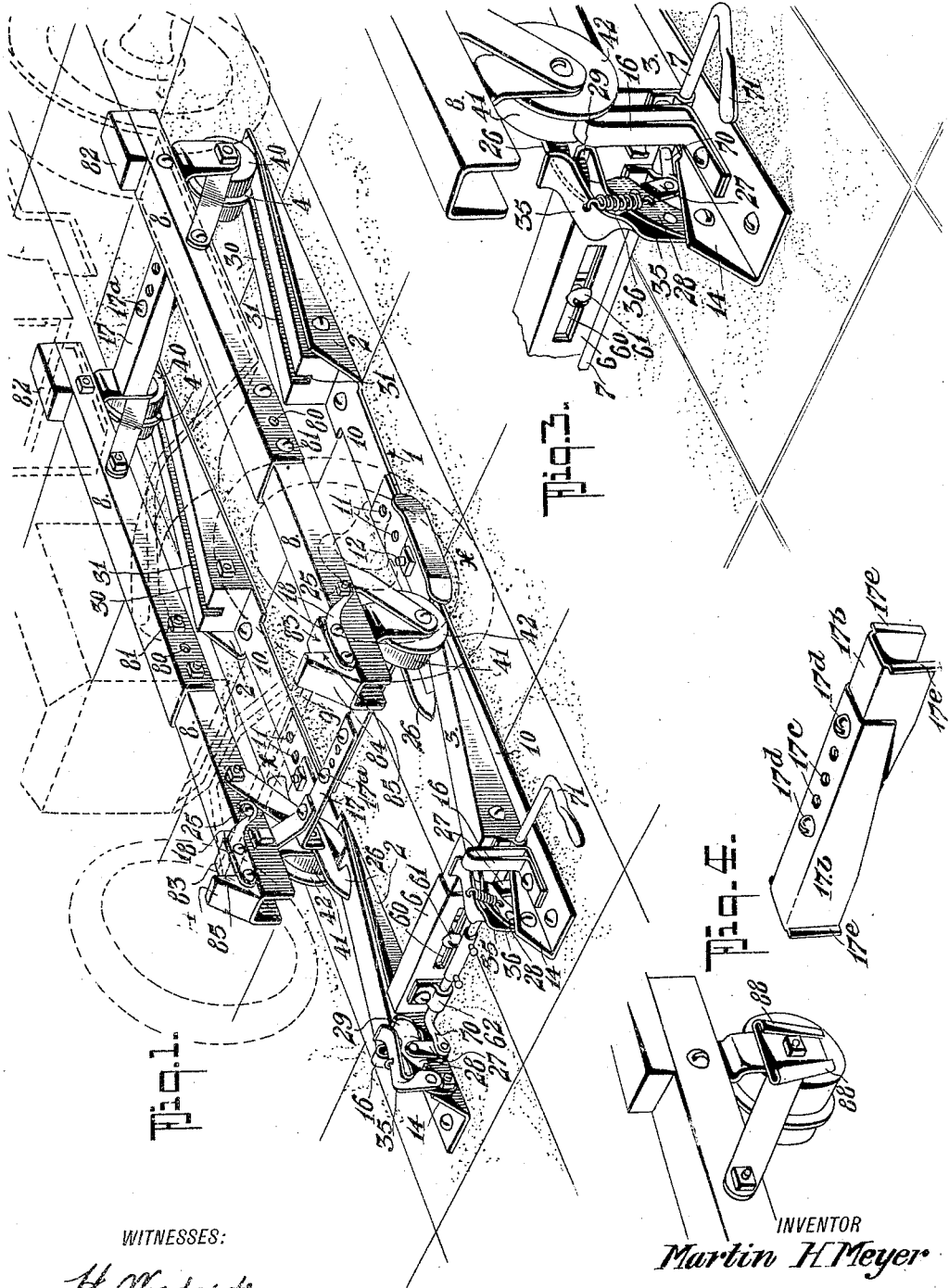

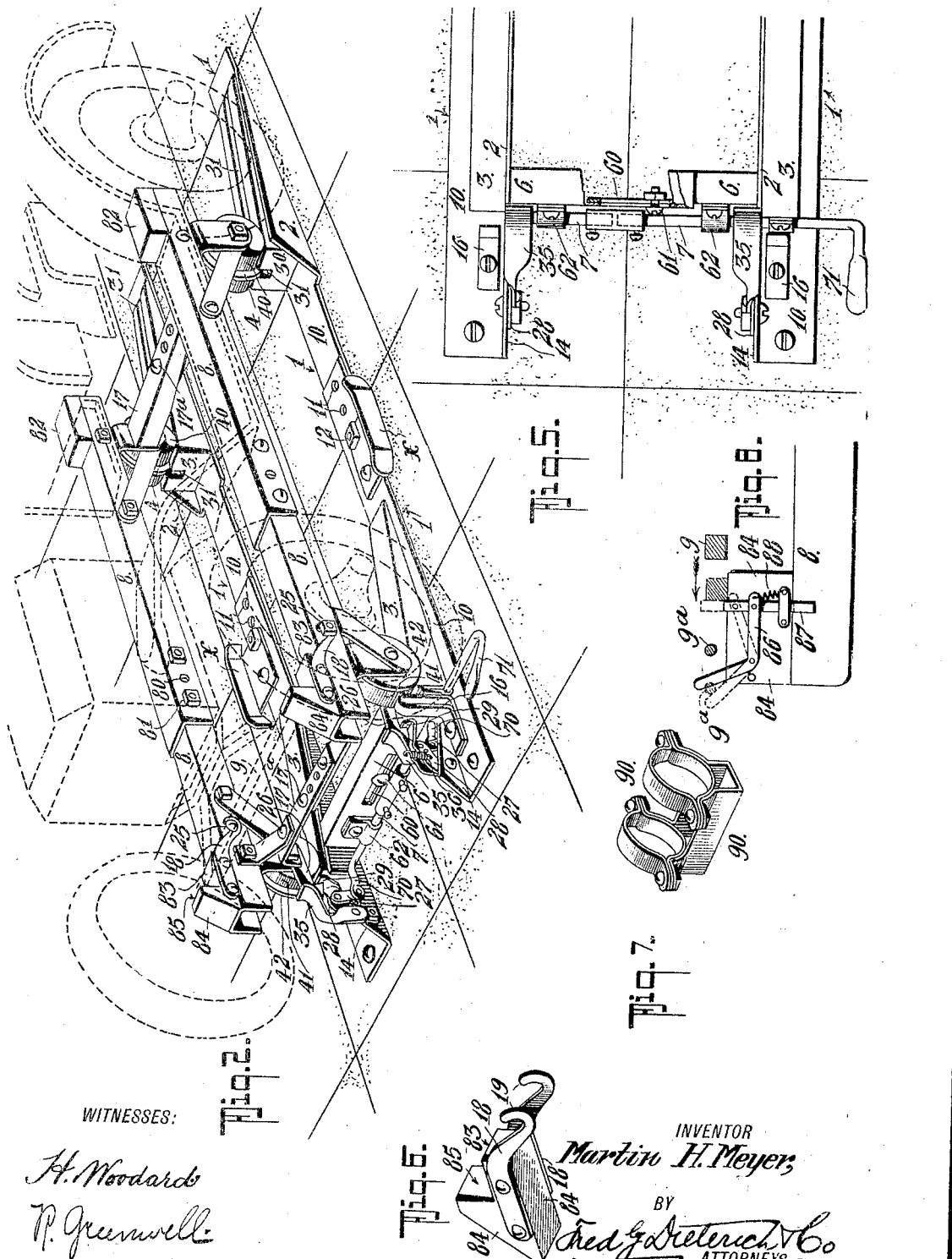

MARTIN H. MEYER, OF PENDER, NEBRASKA.

AUTOMOBILE-JACK.

1,094,004.

Specification of Letters Patent. Patented Apr. 21, 1914.

Application filed April 5, 1913. Serial No. 759,227.

*To all whom it may concern:*

Be it known that I, MARTIN H. MEYER, residing at Pender, in the county of Thurston and State of Nebraska, have invented certain new and useful Improvements in Automobile-Jacks, of which the following is a specification.

This invention, which relates generally to means for lifting vehicle bodies off the ground as they are moved into operative connection therewith, is more especially intended for use as an automobile jack, in which the several parts are coöperatively so arranged that the momentum of the auto, as it engages with the jacking devices, causes the said devices to raise the auto to relieve the tires from strain and to provide for readily and conveniently repairing or replacing tires and making other desired repairs.

My invention is an automobile jack in which is embodied the peculiar and novel construction and the detailed arrangement of the parts hereinafter fully explained, specifically pointed out in the appended claims and illustrated in the accompanying drawings, in which:

Figure 1 is a perspective view of my invention, the movable carriage or supporting frame being at its rearward or normal position, the front and rear axles of an approaching automobile being indicated and positioned as about to engage with the said carriage or frame. Fig. 2 is a similar view, the carriage or frame being shown at its forward or automobile supporting position, the latter being shown at its lifted position, and the carriage or frame being held locked to its forward position. Fig. 3 is a perspective view of the front end of one of the inclined trackways and the bumper devices that coöperate therewith. Fig. 4 is a detail perspective view of a modified construction of parts thereof hereinafter specifically referred to. Fig. 5 is a plan view of the front end of the base or platform portion of my auto jack, parts being shown in section for illustrating the adjustable connections. Fig. 6 is an enlarged detail of the spring latch devices for holding the supporting carriage to its forwardly shifted position. Fig. 7 is a perspective view of a bumper clip hereinafter specifically referred to, and Fig. 8 is a detail view of a modified form of bumper hereinafter specified.

The main object of my invention is to provide a compact, inexpensive and effective means of the general character stated, that can be readily located in a garage and adjusted in such a manner that the auto vehicle may be conveniently run into position and caused to engage the jack to automatically set it, as it were, to lift the auto from the ground and supported ready for making the desired repairs.

In carrying out my invention, I provide a base frame consisting of two metal bars 1—1, each formed of two sections 10—10, the adjacent ends of which have apertures 11—11 and overlap to receive the clamp screws 12, such means of connection providing for longitudinally adjusting the side bars 1—1 before fastening them down to the floor. The front and rear sections of the said bars 1—1 have vertical side flanges 2—2 that form side stays and provide for securing the inclined trackways 3—30, the rear ones having a longitudinal slot 31 for receiving the central rim flange 4 on the rear wheels 40 of the carriage or movable supporting frame 5, which also includes the front wheels 41 having an outside rim 42, it being understood from the drawings the front wheels travel on the front trackways 3. The side bars 1—1 are connected at the front end, by a transverse connection, consisting of two overlapping plates 6—6 having alining horizontal slots 60 for adjusting the length of the said connection, the adjustments being held by the clamp screws and nuts 61—61.

62—62 designate brackets on the front of the plates 6—6 and in these is rockably mounted a rod 7 also formed of longitudinally extensible sections and provided with crank portions 70—70, one end being extended to one side of the base of the structure and terminating in a second crank shaped to form a foot lever 71.

The carriage or supporting frame includes two side bars 8—8 each formed of two sections having alining apertures 80—80 for receiving the clamping bolts 81 that hold the said sections to their longitudinal adjustments. The said side bars carry the front and back wheels 41—40, and at their rear ends they each have a wooden bearing block 82, the upper face of which is in the plane of the bearing surfaces 83 of bumper backs 84 on the front end of the bars, the vertical or bumping faces 85 of which are arranged to be engaged by front axle 9 of the motor vehicle.

16—16 designate yielding bumpers located at the front of the forwardly inclined trackways for retarding the forward travel of the carriage or supporting frame.

The side bars 8—8 of the carriage are joined at their front and rear ends by a transverse connection, which may be two laterally adjustable members 17, each fixedly secured to its respective side bar 8, as shown in Figs. 1 and 2, and provided with apertures for receiving the clamping bolts 17ª.

Instead of fixedly connecting the members 17 to their respective side bars 8, as above stated, the said cross connection may be formed of two members 17ᵇ, ⊓-shaped in cross section, and arranged for telescopically engaging, each of the sections having apertures 17ᶜ for receiving the clamp bolts 17ᵈ, the said sections also having lateral flanges 17ᵉ for sliding into keepers 88 on the sides of the bars 8, as shown in Fig. 4 of the drawings.

The front or bumper blocks 84 are detachably mounted on the side bars 8 and for such purpose they are secured to metal side arms 18—18 whose rear ends are bent down and terminate in upturned hooks 19—19, shaped for being conveniently slipped under the stud bolts 25, on the side bars 8—8, as shown.

26—26 designate fixedly held pawls, one of which projects forwardly from each side of the carriage frame and the said pawls 26, when the said carriage or movable frame is forced forwardly in the manner presently stated, engage with a suitable latch device, the construction of which is best shown in Figs. 1 and 3, by reference to which it will be seen to each of the cranks 70 in the rockable rod 7 is pivotally joined a link 27 that joins with a latch bar 28 pivotally mounted on a bracket 14 on the base plate 1, the hook end 29 of which is suitably positioned to be engaged by its corresponding pawl 26.

35 designates a supplemental latch member that is pivotally hung on the latch bar 28. The free end of the member 35 is bent up to extend over the hook end 29 of the latch bar 28 to guide the locking pawl 26 on the carriage into a proper engagement with the said hook end 29 and the said free end of the latch 35 is normally held down over the hook end 29 by a coiled spring connection 36.

By reason of the peculiar arrangement and construction of the parts described, it will be readily understood by now referring to the drawing, that when the several parts are at the normal position, as shown in Fig. 1 of the drawings, that when driving the auto vehicle in the direction indicated, the bumper devices 90 engage the bumpers 84 on the bars 8, and in consequence move the carriage or supporting frame with it, and the latter under momentum, traveling up the inclined trackways, lifts the auto from the ground with the rear axle of the said auto resting on the rear bumpers on the side bars 8, it being understood the pawls 26—26, during the forward thrust of the carriage or supporting frame engage and interlock with their respective latch devices. To release the carriage frame to permit it to travel back down the incline trackways and the auto vehicle to lower to the floor, it is only necessary for the operator to depress the foot lever 71 to rock the shaft 7, and thereby open the latch devices to release the said pawls 26.

For autos that have a thrust rod under the rear axle, I use bumper clips 90, see Fig. 7, and these are attached to the rear axle and form abutting elements for engaging the bumper.

Guides $x$ are provided for holding the front wheels from running sidewise off the jack, and the said guides are arranged as shown in Fig. 1.

Since some autos have a steering rod running in front and in line with the front axle, for such type of autos I have provided a modified form of bumper, and the same is illustrated by Fig. 8 of the drawings, in which 9 designates the front axle, and 9ª the thrust rod. 86 denotes a bell crank lever that is normally held down by a spring 88 to project its vertical member in the path of movement of the thrust rod when traveling in the direction of the arrow. 87 designates a stop connected with the bell crank 86 which is forced up in the plane of the forward movement of the axle 9 by reason of the thrust rod 9ª shifting the lever 86.

What I claim is:

1. In an automobile jack; base supports having inclined trackways, a carriage mounted to move upon the said inclined trackways and adapted for being moved up the said trackways by the forward impulse of the vehicle to be lifted, means for holding the carriage and the vehicle supported thereon locked to their elevated position, said means including a spring jaw latch held to a normal position under spring tension, a hook on the carriage for engaging and interlocking with the said jaw after the carriage and the vehicle thereon have reached their elevated position, and a crank lever shaft connected with the said spring jaw latch for releasing said latch to free the carriage.

2. In an automobile jack; base supports having inclined trackways, a carriage mounted to move upon the said inclined trackways and adapted for being moved up the said trackways by the forward impulse of the vehicle to be lifted, means for holding the carriage and the vehicle supported thereon locked to their elevated position, said means including a spring jaw latch held to a normal position under spring tension, a hook on the carriage for engaging and interlocking with the said jaw after the carriage and the vehicle thereon have reached their elevated position, a crank lever shaft, a pivoted lifting member that engages the spring jaw latch connected with the crank lever and adapted for releasing the latch to free the carriage when the crank lever is actuated.

3. An automobile jack comprising inclined trackways, a carriage mounted on the trackways and operated by the vehicle to be lifted, the said carriage having a forwardly and fixedly held pawl, a crank shaft connected with the trackways, a catch pivotally mounted on the crank of the said shaft, a combined lifter member and guide pivotally mounted on the catch and extended beyond the locking edge of the said catch, the extended end of the said member being held down over the said edge of the catch under spring tension.

MARTIN H. MEYER.

Witnesses:
E. A. WILTSE,
H. D. HANCOCK.